Y. SHINOZAWA.
TYPE WRITER.
APPLICATION FILED JUNE 19, 1918.

1,297,020.

Patented Mar. 11, 1919.
7 SHEETS—SHEET 1.

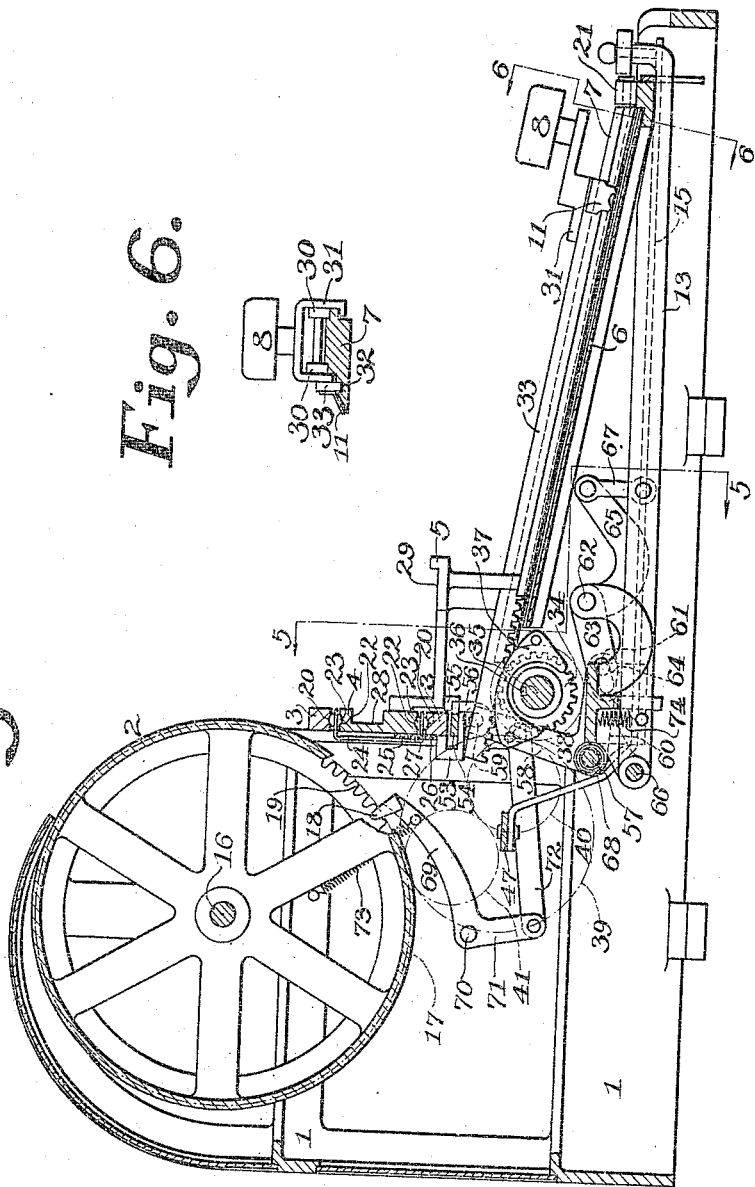

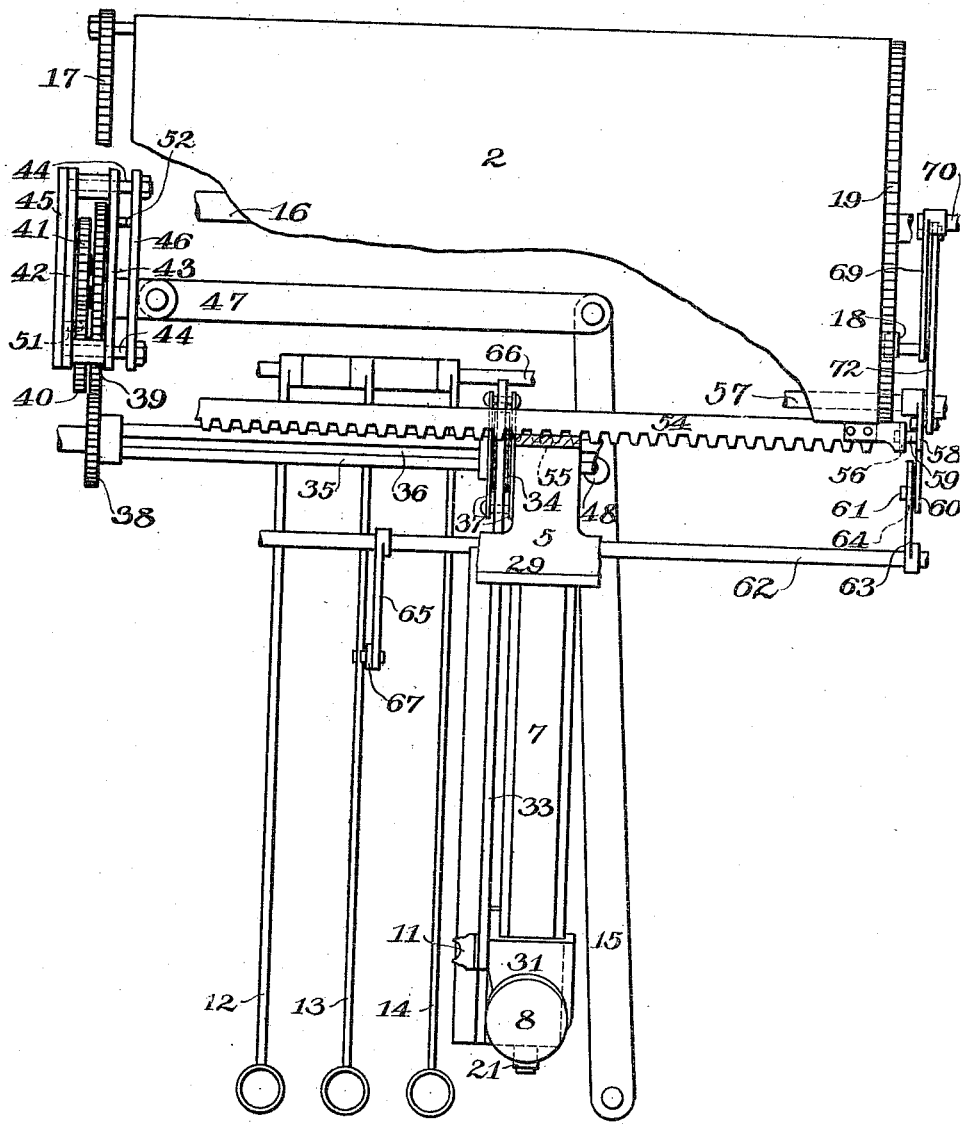

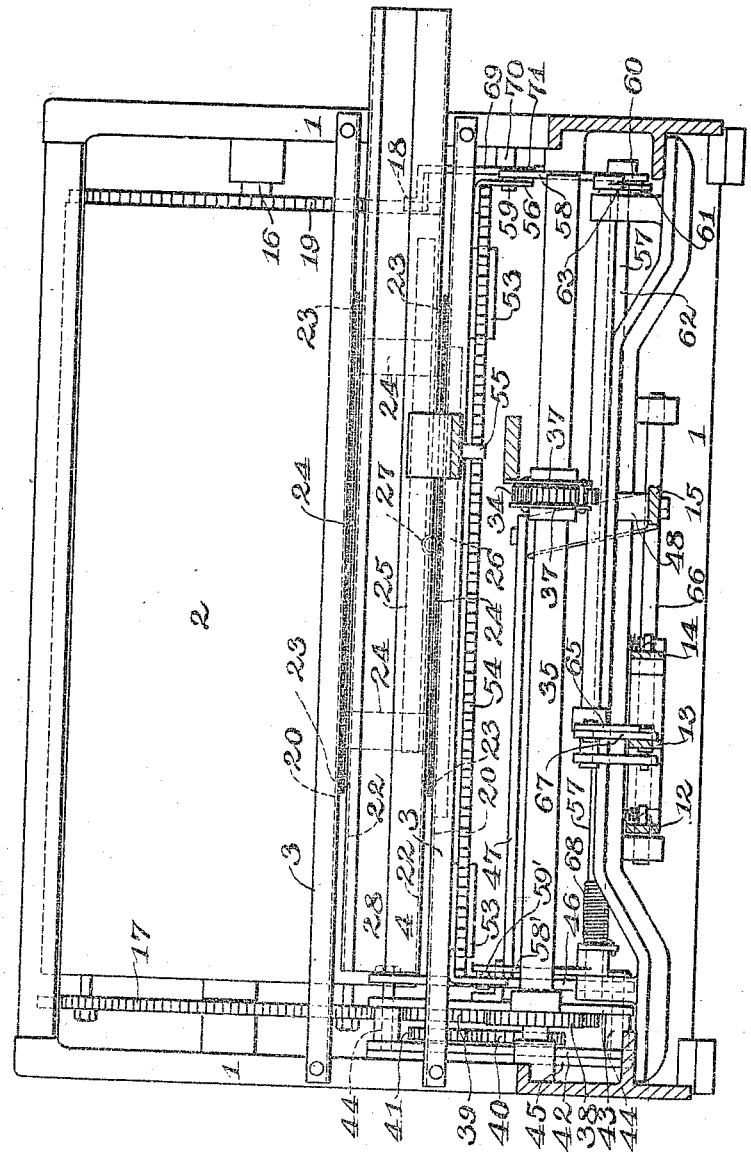

Y. SHINOZAWA.
TYPE WRITER.
APPLICATION FILED JUNE 19, 1918.
1,297,020.
Patented Mar. 11, 1919.
7 SHEETS—SHEET 5.
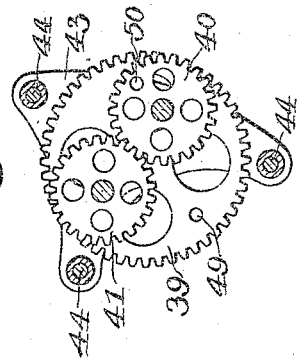
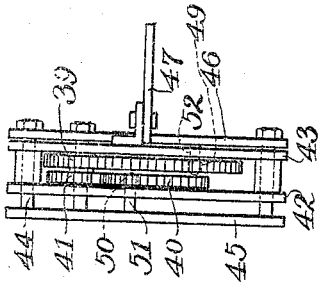
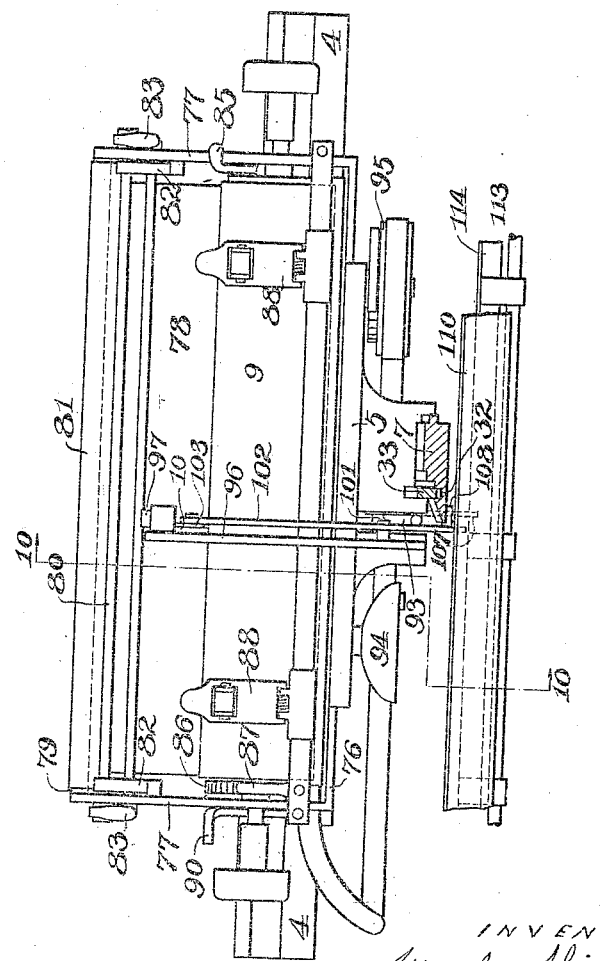
INVENTOR:
Yusaku Shinozawa
By Wm Wallace White
ATT'Y.

Y. SHINOZAWA.
TYPE WRITER.
APPLICATION FILED JUNE 19, 1918.
1,297,020.
Patented Mar. 11, 1919.
7 SHEETS—SHEET 6.
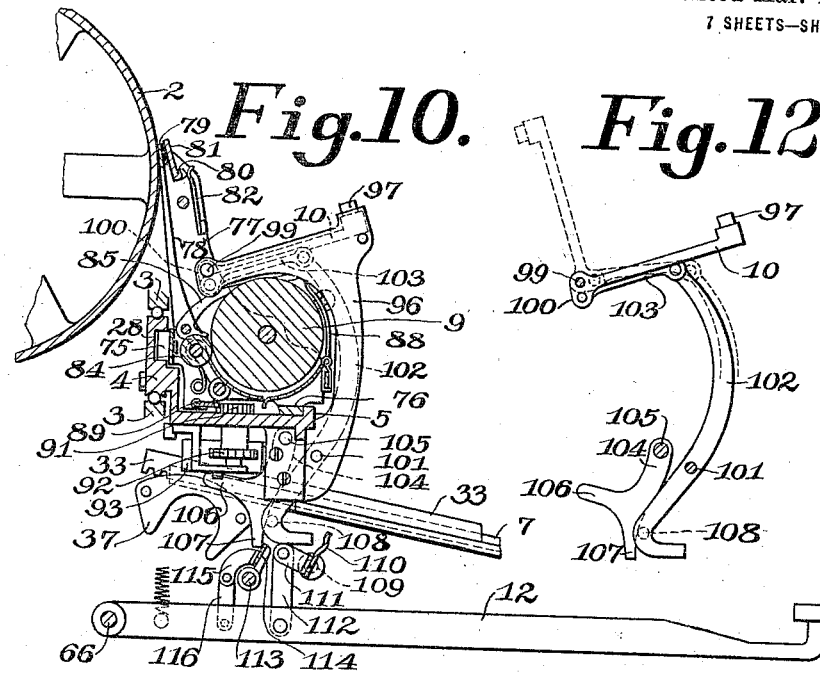
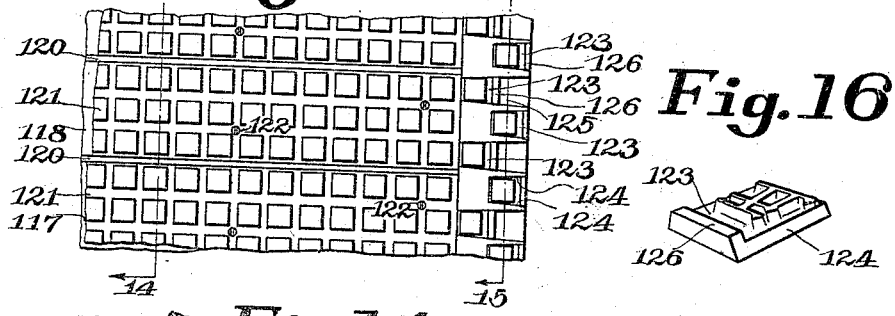
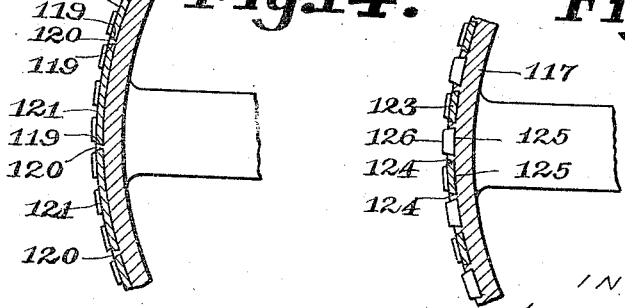
INVENTOR:
Yusaku Shinozawa
By Wm Wallace White
ATTY.

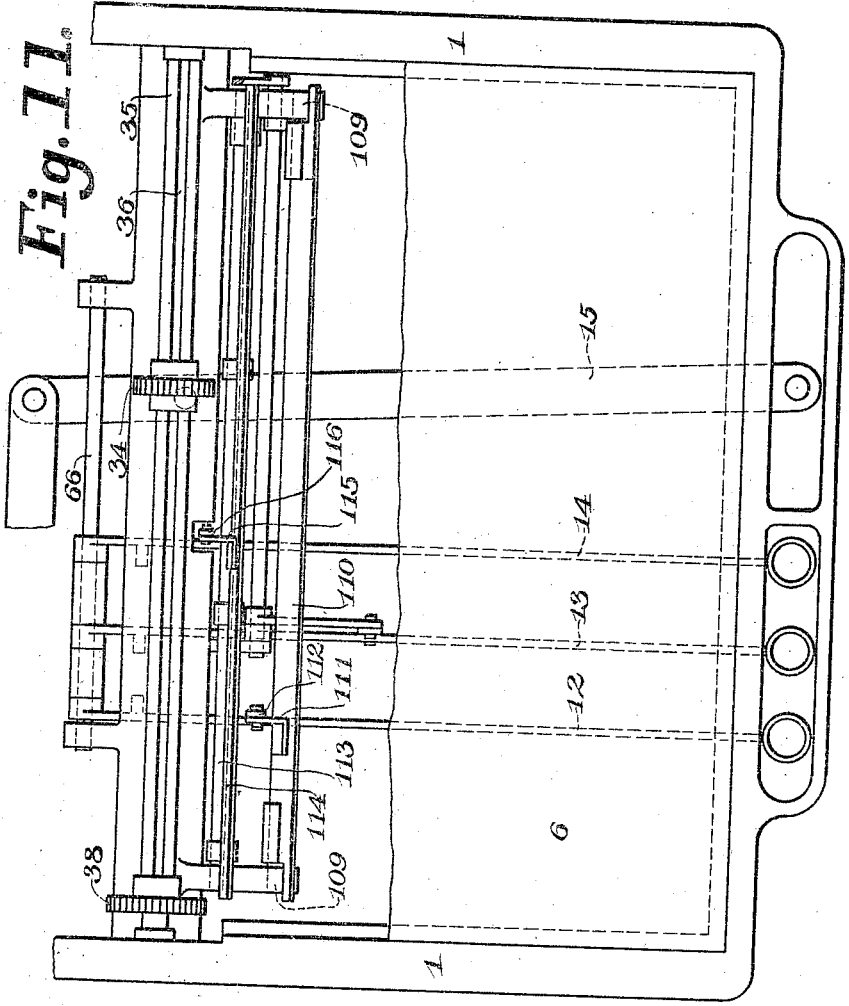

UNITED STATES PATENT OFFICE.

YUSAKU SHINOZAWA, OF TOKYO FU, JAPAN.

TYPE-WRITER.

1,297,020.     Specification of Letters Patent.    Patented Mar. 11, 1919.

Application filed June 19, 1918. Serial No. 240,760.

*To all whom it may concern:*

Be it known that I, YUSAKU SHINOZAWA, subject of the Emperor of Japan, residing at No. 1788 Shimo Shibuya, Shibuya Machi, Toyotama Gun, Tokyo Fu, Japan, have invented new and useful Improvements in Type-Writers, of which the following is a specification.

This invention relates to typewriters, and particularly to that kind of typewriters which is adapted for typewriting a language in which a large number of characters are used, such as the Japanese or the Chinese language, and consists of a type-drum on which are engraved a large number of characters and signs; a character index board on which are indicated all the characters and figures which are engraved on the type-drum, arranged in the same order; and a sliding piece which can be moved over the surface of the character-index to any desired point either backward or forward, or right or left, and which, while being moved, causes through intermediate mechanism the type-drum to revolve, or the paper roller to travel right or left.

The main object of this invention is to obtain a type-writer which is provided with a large number of characters and figures, comparatively small in size and light in weight, and can be easily worked. The other objects are to provide mechanism by which movement of the sliding piece to any desired point of index board causes the type-drum to revolve to such a position that the character corresponding to the one of the index to which a pointer attached to the sliding piece points, is brought to the printing position; to obtain a typewriter in which any desired character can be easily found; to provide a device by which the revolution of the type-drum and the movement of the paper-drum, is exactly regulated; to obtain a type-drum which is small and light but is engraved with a large number of types, and in which supplementary characters can be easily inserted or taken off; to obtain a mechanism by which one half or the other half of the type-drum can be brought to the printing position as desired; and to obtain printing and spacing devices which can be worked by a pivotally mounted lever no matter to what position the paper-drum carriage is moved.

The accompanying drawings, which form a part of this application, show one construction embodying all the essential features of this invention.

In the drawing,

Fig. 3 is a longitudinal vertical section of the same after removing the spacing device, printing device and paper-drum carriage, and shows the device for turning the type-drum, the device to move the paper-drum carriage, and the device to regulate the movement of the above two devices;

Fig. 4 is a plan view of the devices illustrated in Fig. 3;

Fig. 5 is a sectional front view of Fig. 3 on the line 5—5;

Fig. 6 is a cross section of the guide arm on the line 6—6 of Fig. 3;

Fig. 7 is a side view of the gearing for reversing the revolution of the type-drum, and Fig. 8 is a front view of the same;

Fig. 9 is a front view of the paper-drum, paper-drum carriage, printing mechanism and spacing mechanism;

Fig. 10 is a section of Fig. 9 on the line 10—10, showing also the relative position of the type-drum;

Fig. 11 is a plan view of part of the frame of the typewriter of my invention and of mechanism shown in Fig. 10, removing the paper-drum and paper-drum carriage, and parts connected thereto;

Fig. 12 is a side view showing connections of various levers of the printing mechanism and spacing mechanism;

Fig. 13 is a plan view of the type-drum;

Fig. 14 is a section of Fig. 13, on the line 14—14;

Fig. 15 is another section of Fig. 13 on the line 15—15; and

Fig. 16 is a detail perspective view of a supplementary type plate.

The same reference numbers refer to the same or corresponding parts throughout all the figures.

Figure 1:
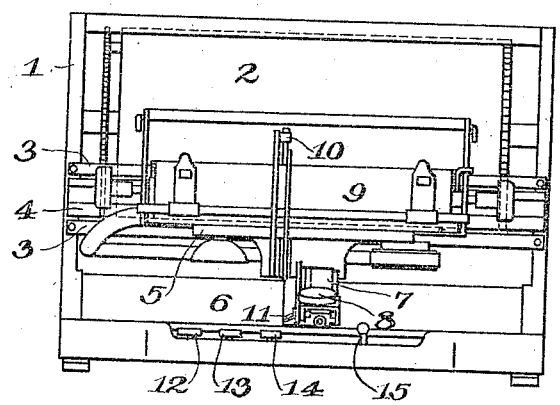
Figure 1 is a front view of a typewriter constructed in accordance with my invention.
Figure 2:
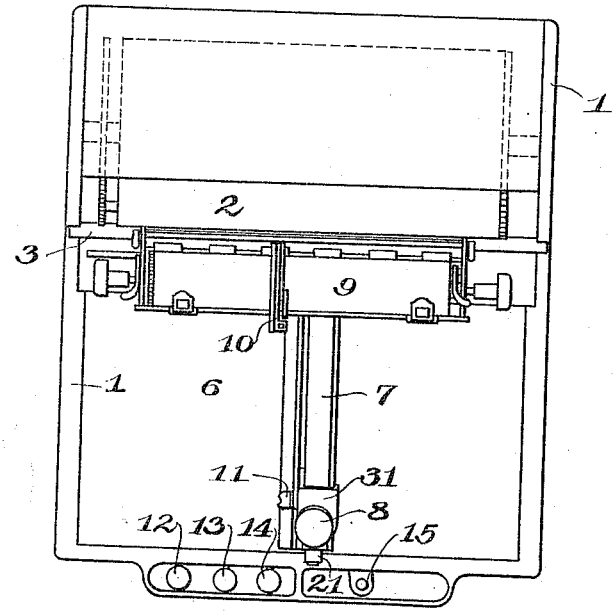
Fig. 2 is a plan view.

In the typewriter of my invention, the whole view of which is shown in Figs. 1 and 2, at the back part of a frame (1) is revolubly mounted a type-drum (2) on which are engraved a large number of characters and signs.

In front of the type-drum (2), parallel to it, is fixed two rails or ball-races (3) on which a paper-drum carriage (4) (5) travels right and left. From the paper-drum carriage (4) (5) projects forward and over a character index board (6) a guide arm (7) on which moves backward and forward a sliding piece (31).

On the paper-drum carriage (4) (5) is supported a paper-drum (9), which moves right and left and also revolves on its own axis. These parts are so arranged that by causing the type-drum (2) to revolve by moving the sliding piece (31) backward and forward along the guide-arm (7) and the paper-drum carriage to travel right or left together with the printing mechanism attached thereto by moving the sliding piece (31) together with the guide-arm (7) right or left, any character engraved on the type-drum which corresponds to the character of the character-index to which the pointer (11) of the sliding piece (31) points, can be brought to the printing position. Then if the printing lever (12) is pressed down, the hammer (10) strikes against the character and prints it on the paper which is held close in front of the type-drum.

At the same time the paper-drum carriage is moved one character space, and if it is desired to move the carriage one character space without printing any character, the object can be attained by pressing down the spacing lever (14). In order to make the revolving motion of the type-drum and the lateral motion of the paper-drum carriage exact, it is so constructed that unless a release lever (13) is pressed down the sliding piece (31) cannot be moved in any direction either on the guide arm or together with it. It is also constructed so that the movement of the sliding piece (31) along the whole length of the guide arm makes the type-drum revolve one half way, and when it is desired to bring the other half of the type-drum to the printing position, it is effected by means of a type-drum-reversing lever (15) provided for the purpose. Thus, as in this invention the printing point makes lateral motion parallel to the axis of the type-drum and the paper also moves parallel thereto, characters are printed laterally and when a whole line is printed, the paper-drum is turned one line space and the next line is printed. Thus in a language such a Japanese or Chinese, in which characters are written vertically from the top to the bottom, characters in the type-drum must be arranged with the top toward the left.

The type-drum (2) has on its periphery a large number of characters and figures engraved by a means to be described later on or by any other means, and is mounted on the frame (1) as is shown in Figs. 3, 4 and 5 by means of shaft (16). To one extremity of the type-drum is attached a toothed wheel (17) through which revolving motion is transmitted thereto. On the other extremity there is fixed a toothed ring (19) which is engaged by a pawl (18). As will be described later on, when the release lever (13) is pressed down the pawl (18) disengages the toothed ring (19) and the type-drum becomes free to revolve. The toothed wheel (17) is geared through intermediate toothed wheels with an axle which is revolved as will be described later, by moving the sliding piece (31) backward and forward.

In front of and parallel to the type-drum (2), there are fixed to the frame (1), as shown in Figs. 3 and 5 two parallel rails or ball-races (3) (3), and the lower surface of the upper race and the upper surface of the lower race are each provided with a groove (20). The paper-drum carriage (5) has a back plate (4) which is guided by the ball-races (3) (3). Arranged above and parallel to the character-index board (6) is the guide arm (7), the front end of which latter rests on the front edge of the said character-index board by a roller (21). The back plate (4) is provided on its upper and lower sides with grooves (22) corresponding to those of the ball-races (3), and between the back plate and the ball-races are placed a number of balls (23). Thus the paper-drum carriage can be moved easily right and left. In order that the balls may never move out of the contact surfaces of the ball-races and the back-plate, a ball-retainer (24) is provided. This ball-retainer (24) has a pinion (27) which engages a rack (25) fixed to the back of the back plate (4) and another rack (26) attached to the back of the lower ball race (3). Thus the balls make lateral motion much more slowly than that of the back-plate, and never get out of the contact of the back-plate and the ball-races. The paper-drum (9) is mounted on the carriage and makes lateral motion on a groove (28) of the back-plate (4) and a rail (29).

The guide arm (7) is fitted, as is shown in Figs. 3 and 6, with a sliding piece (31) which is provided with a roller (30) and a knob (8). To this sliding piece (31) are attached a rack (33) which is guided by a groove (32), and a pointer (11). Thus, if the sliding piece (31) is moved forward or backward so that the pointer (11) attached thereto points a required character, the rack (33) will be moved correspondingly. Now, the rack (33) engages a pinion (34) which is fitted on the shaft (35) in such way that it can move over the shaft right and left, but does not revolve except with the shaft (35), there being on the shaft (35) a groove (36) and the pinion (34) having a projection fitting into the groove (36). The pinion (34)

is placed between two projecting pieces (37) of the paper-drum carriage, so that it moves right and left together with the paper-drum carriage, and at any place it can be made to revolve by the backward or forward motion of the rack (33).

At one end of the shaft (35) is firmly fixed, as is shown in Figs. 4 and 5, a toothed wheel (38), which either through another toothed wheel (39) or a pair of toothed wheels (40) (41) engages the toothed wheel (17) of the type-drum. The toothed wheels (39), and (40) and (41) are, as shown in Figs. 4, 5, 7 and 8, mounted on the gear frame (42) (43) which is supported by and moves on guide bars (44) firmly fixed to the frame (1); and the movement of the gear frame (42) (43) is limited by side plates (45) (46). To a side piece (43) of the gear frame is pivoted, as is shown in Fig. 4, a bar (47) which is connected with the type-drum reversing lever (15) fulcrumed to the frame (1) at (48). Thus, when the lever (15) is in the position as shown in Fig. 4, the toothed wheel (38) gears with the toothed wheel (17) through the wheel (39), and the type-drum turns in the same direction as that of the shaft (35), but if the lever (15) is pulled to the left, then the wheel (39) is disengaged from gearing and the pair of wheels (40) and (41) comes into gearing with the wheel (38) and wheel (17) and in this case the type-drum turns in the direction opposite to that of the shaft (35). As is shown in Fig. 7, the wheels (39) and (40) have holes (49) and (50) respectively, and the side plates (45) and (46) are provided, as is shown in Fig. 8, with pins (51) and (52), respectively, which fit the holes (49) and (50) respectively. Thus, unless the wheels (39) and (40) are exactly at the position where their holes correspond to the pins (51) and (52), they cannot be moved either way and such position is reached when the sliding piece (31) is moved the whole length of the guide arm to the front extremity, and by such travel of the sliding piece (31), the type-drum is made to turn a half way around. Then if the type drum reversing lever (13) is moved, any character on the other half of the periphery of the type-drum can be brought to the printing position by moving the sliding piece (31). If it is so desired, the rack (33) and the guide arm (7) may be made so long that by moving the sliding piece (31) over the whole length of the guide arm, the type-drum can be made to make one revolution, and then a reversing mechanism will be unnecessary. But in order to make the character index board as small as possible the present construction has been preferred. And if the more frequently used characters are engraved on one side of the type drum and less frequently used characters on the other half, not much inconvenience will be felt, especially as the other half of the type drum can be brought to the printing position merely by shifting the reversing lever.

With a view to keeping the type-drum and the paper firm in the exact position when to print a character, a stopping mechanism is provided. As is illustrated in Figs. 3, 4 and 5, below the lower ball race (3) is provided a rack (54) which rests on guide pieces (53) and moves backward and forward, and engages a projection (55) on the lower surface of the paper drum carriage (5). Thus, the paper drum carriage cannot move unless the rack (54) recedes and disengages the projection (55). The pawl (18) catches the toothed ring (19) and unless the pawl (18) disengages the ring (19), the type drum cannot be revolved. Now, the toothed ring (19) is disengaged from the pawl (18) and the projection (55) of the paper drum carriage from the rack (54) in the following manner:—

The rack (54) is provided at each end with a forked arm (56) one of which fits with a pin (59) of a bell crank (58) and the other with a pin (59') of another bell crank (58'), both the bell cranks (58) and (58') being rigidly fixed to the shaft (57). One arm of the bell crank (58) has a pin (61) which fits in a slot (64) of an arm (63) and this arm (63) is rigidly fixed to a shaft (62) mounted on the frame (1). Another arm (65) which is also rigidly fixed to the said shaft (62) is connected by a connecting rod (67) with the release lever (13) which is fulcrumed on the frame at (66). As shown in Fig. 3, the shaft (57) is fitted with a spring (68) which biases the shaft in a clockwise direction when viewing the typewriter from the left. The pawl (18) is in form a bell crank and is pivotally mounted on the frame (1) at (70). One arm (71) of the said pawl or crank is connected with the above mentioned bell crank (58) by means of a connecting rod (72), and the other arm is pulled by a spring (73) so as to make the pawl catch the toothed ring (19). Thus, if the release lever (13) is pushed down, the rack (54) recedes and disengages the projection (55). At the same time the pawl (18) disengages the toothed ring (19) and the paper drum carriage is now free to move right or left and the type drum to revolve. If now the release lever is released, the lever returns to its former position by means of a spring (74), and the rack (54) and the pawl (18) being actuated by springs (68) and (73) resume their locking positions and keep the type drum and paper drum at exact position while printing a character.

The paper drum (9) is supported, as is shown in Figs. 9 and 10, on the paper drum carriage (4) (5) by means of a roller (75)

on the back which fits into the groove (28), and at the bottom by means of sliding board (76), and is pivotally mounted on a paper drum frame (77). To the paper drum frame (77) is fixed a paper table (78) in front of the upper edge (79) of which there is a paper pressing board (81) which presses the paper against the upper edge (79) of the paper table (78) being pushed by a spring (82) and which is released by means of a shaft (80) having a knob (83). To the paper drum frame (77) are fixed pressure rollers (84) as are commonly used in typewriters, and a lever (85) to separate them; a ratchet wheel (86) and a pawl 87; paper fingers (88); a rack (89) for obtaining a character space and a knob (90) by which the rack (89) is raised or lowered; and any suitable mechanism to obtain a line space. To the paper drum carriage are fixed a ratchet wheel (92) which is freed and moves, tooth by tooth by a character space mechanism (93), such as is commonly used; a pinion (91); a bell (94); and a spring case (95). The paper drum frame has a member (96) which extends from the lower member over the paper drum to the upper member of the frame. To this member (96) is pivoted at (99) a hammer (10) which has a head (97) of hard india rubber or the like substance. As is shown in Fig. 12, this hammer has a short arm (100), and this arm (100) is jointed to a lever (102) which is fulcrumed on the member (96) at (101), by means of a connecting rod (103). A spacing bell crank (104) is fulcrumed on the paper drum carriage at (105), one arm (106) of which being in contact with the lower surface of the spacing mechanism and the other arm (107) with a projection (108) of the lever (102). Thus, if the lower end of the lever (102) is pushed backward, the hammer (10) will move to the position shown in Fig. 12 by dotted line, and the head (97) thereof will strike against the type-drum, thus printing the character on the paper which lies between the type drum and the hammer. At the same time the projection (108) of the lever (102) will push the lower arm (107) of the bell crank (104), which will cause the upper arm (106) of the same bell crank (104) to raise the character spacing mechanism (93). When these parts return to their former positions, the ratchet wheel (92) will be freed by one tooth and the spring (95) will cause the paper drum to move by one character space to the right. If it is desired to move the paper drum one space to the right without printing a character, it can be done by pushing the arm (107) of the bell crank (104) backward.

The above mentioned printing and spacing actions are effected by means of a printing lever (12) and a spacing lever (14), both of which turn on a shaft (66) fixed to the frame (1) and are pulled upward by springs. The printing lever (12), as is shown in Figs. 10 and 11, is connected through a connecting rod (112) with the arm (111) of a bar (110) fixed to a shaft (109) revolubly mounted on the frame (1). The spacing lever (14) is connected through a connecting rod (116) with the arm (115) of a board (114) which is fixed to a shaft (113) mounted on the frame (1). Thus, if the lever (12) is pressed down, the board (110) will revolve forward with the shaft (109) as the center and will push the lower extremity of the lever (102) backward. This, as has been already described, will effect the actions of printing and spacing.

On the other hand if the lever (14) is pressed downward, the bar (114) will revolve forward with the shaft (113) as the center and push backward the arm (107), which sends the paper drum one space right without printing any character, as has also already been explained. The lever (102) and the bell crank (104) move right and left together with the paper drum, but as the boards are long and extend nearly the whole width of the machine, they can perform the above mentioned action at any position of the said lever and bell crank.

The type drum (2), in order to make it small and light as far as possible, is preferably constructed as shown in Figs. 13 to 16. (117) is a hollow cylinder having a number of shallow grooves (118), which broaden toward the bottom, so that its cross section has a form of dovetail. Thus every two adjacent grooves have between them a bank (120) which is broader at the top and narrower at the bottom. Into each of these grooves is inserted a type plate (121), which is, as has been explained, made in such a form as to tightly fit the groove and on which are engraved one or several rows of characters; and thus the type-drum is formed. In order to prevent the type plate (121) from jumping out from the groove (118) or dancing therein, it is secured to the cylinder with counter-sunk screws (122); or the groove and the type plate may be made slightly narrower toward one end. A type drum formed in this manner is light in weight, notwithstanding that it contains a large number of characters well adapted to typewriters of the kind herein described, and convenient in use. Moreover, there is one advantage that a worn out, or otherwise mutilated type plate can be replaced without touching the other type plates.

In Fig. 13 type plates are shown with three rows of characters engraved thereon, the small squares shown there representing engraved types. The same figure shows also supplementary type plates which are constructed and inserted into the cylinder (117) similarly in the principle as the type plate (121), but they are so formed that they can be inserted into the groove, or taken out therefrom with greater ease. The supplementary type plate (123) has engraved on it one or several characters. As is shown in Fig. 16, it broadens toward the bottom, so that its cross section has a shape of dovetail, and is narrower on one side than on the other. On one extremity of the cylinder, grooves (125) are formed, as shown in Fig. 13, so that they exactly correspond to supplementary type plates. These latter are inserted from a side into the grooves (125), when required; and in order to facilitate the removal of supplementary type plates, each of them is provided at its broader side with a raised edge (126) to catch the hand or tool when removing it. These supplementary type plates are inserted into the type drum when it is desired to print characters not found therein, and their insertion can be easily effected. Moreover, they are very light and their insertion increases the weight of the typewriter only very slightly. In Fig. 13, a construction is shown in which the type drum receives supplementary type plates alternately in two columns, because such arrangement is very convenient in detecting characters, and in the use and construction of the machine, but of course the type drum can be so constructed that it receives supplementary type plates in one column.

The typewriter of my invention being constructed as has been described, it is worked as follows:—

First, raise the paper pressing board (81) (see Figs. 9 and 10) and insert a paper and wind it on the paper drum (9). Then, close the paper pressing board (81), and the part of the paper left outside of the paper pressing board will be held in front of the type drum. Next, press down the release lever (13) and move about the sliding piece (31) with the knob (8) until the pointer (11) points to a desired character of the character index-board. Next, let go the release lever, and press down the printing lever (12). Then the hammer will strike against the type drum and the desired character will be printed on the paper. As to inking, ribbon, carbon paper, or any other suitable inking device may be used. When a line has been printed in this way, open the paper pressing board (81), turn the paper drum one line space and print the next line, proceeding as before.

I claim:—

1. A typewriter consisting of a revolubly mounted type drum, on the surface of which are engraved a large number of characters, a paper drum carriage which moves near the surface, and parallel to the axis, of the said type drum, and is provided with a printing mechanism; a paper-drum mounted on the said paper-drum carriage parallel to the axis of the said type-drum, and which independently moves right and left on the carriage; a character index board; a sliding piece which can be moved over the character index board to any desired point; a mechanism which connects the said sliding piece with the type-drum in such a way that by backward or forward motion of the sliding piece in the direction at right angle with the axis of the type-drum, the type-drum is turned one way or other; and a device by which the motion of the sliding piece parallel to the axis of the type-drum causes the paper-drum carriage together with the paper-drum and the printing mechanism to move parallel to the axis of the paper-drum, substantially as and for the purposes hereinbefore set forth.

2. A typewriter consisting of a revolubly mounted type-drum, on the surface of which are engraved a large number of characters; a paper-drum carriage which moves near the surface, and parallel to the axis, of the said type-drum, and is provided with a printing mechanism; a paper-drum mounted on the said paper-drum carriage parallel to the axis of the said type-drum, and which moves independently right and left on the carriage; a character index board; a guide arm which projects forward from the said paper-drum carriage along the surface of the character index board; a sliding piece which slides over the guide arm backward and forward; and a mechanism through which revolving motion is transmitted to the type-drum by the motion of the sliding piece over the guide arm, substantially as and for the purposes hereinbefore set forth.

3. A typwriter consisting of a revolubly mounted type drum, on the surface of which are engraved a large number of characters; a paper drum carriage which moves near the surface, and parallel to the axis, of the said type drum, and is provided with a printing mechanism; a paper drum mounted on the said paper-drum carriage parallel to the axis of the said type-drum, and which independently moves right and left on the carriage; a character index board; a guide arm which projects forward from the paper-drum carriage along the surface of the character index board; a sliding piece which slides over the guide backward and forward; a mechanism through which revolving motion is transmitted to the type-drum by the motion of the sliding piece over the guide arm; and a mechanism which regulates the revolution of the type drum and the lateral motion of the paper drum carriage, substantially as and for the purposes hereinbefore set forth.

4. In a typewriter, the combination of a frame; a type drum which has a large number of characters engraved on its surface, revolubly mounted at the back of the said frame; rails or ball races firmly fixed to the said frame near the surface, and parallel to the axis, of the type drum; a paper drum carriage which is supported by and travels on the said rails or ball races; a character index firmly fixed to the front part of the said frame; a guide arm which projects forward from the said paper drum carriage along the surface of the said character index; a sliding piece which slides on the said guide arm; and a mechanism through which revolving motion is transmitted to the said type drum by the movement of the sliding piece, substantially as and for the purposes set forth.

5. In a typewriter, the combination of a frame; a type drum which has a large number of characters engraved on its surface, revolubly mounted at the back of the said frame; rails or ball races firmly fixed to the said frame near the surface, and parallel to the axis, of the type drum; a paper-drum carriage which is supported by and travels on the said rails or ball races; a character index board firmly fixed to the front part of the said frame; a guide arm which projects forward from the said paper-drum carriage along the surface of the said character index board; a sliding piece which slides on the said guide arm; a mechanism through which revolving motion is transmitted to the said type drum by the movement of the sliding piece; and a mechanism which regulates the revolution of the type drum and the lateral motion of the paper-drum carriage, substantially as and for the purposes hereinbefore set forth.

6. In a typewriter, the printing device consisting of a movable paper drum carriage; a printing hammer and a printing hammer lever pivoted to the said paper-drum carriage; a connecting rod which connects the said printing hammer and the printing hammer lever; a printing lever fulcrumed on the frame; a long narrow board which extends along the path of movement of the said paper drum carriage and is revolubly mounted on the frame; and a connecting rod which connects the said printing lever to the said long narrow board for the purpose of engaging the lower extremity of the said printing hammer lever when the said printing lever is pressed down, substantially as and for the purposes hereinbefore set forth.

7. In a typewriter, the combination of a movable paper-drum carriage; a printing hammer and a printing hammer lever pivoted to the said paper-drum carriage; a connecting rod which connects the said printing hammer and the printing hammer lever; a spacing bell crank which is pivoted on the said paper-drum carriage; a projection, on the said printing hammer lever, which projection being in contact with the said spacing bell crank; a printing lever which is fulcrumed on the frame; a long narrow board which extends along the path of movement of the paper-drum carriage and is revolubly mounted on the frame; and a connecting rod which connects the said printing lever to the said long narrow board for the purpose of engaging the lower extremity of the said printing hammer lever when the said printing lever is pressed down, substantially as and for the purposes hereinbefore set forth.

8. In a typewriter, a spacing device consisting of a movable paper-drum carriage; a spacing bell-crank pivoted on said paper-drum carriage; a frame member; a spacing lever fulcrumed on the frame member; a long narrow board which extends along the path of movement of the paper-drum carriage and is revolubly mounted on the frame member; and a connecting rod connecting the spacing lever to the long narrow board for the purpose of engaging the lower extremity of said bell-crank when the spacing lever is pressed down, substantially as and for the purpose hereinbefore set forth.

9. In a typewriter, the combination of a revolubly mounted type-drum; a paper-drum carriage which moves parallel to the said type-drum; a character index board; a guide arm which projects forward from the said paper-drum carriage along the surface of the said character index board; a toothed wheel which is firmly fixed to the shaft of the said type drum; a shaft which extends parallel to the direction of the movement of the paper drum carriage and to which is rigidly fixed a toothed wheel that engages the said toothed wheel of the type drum; another toothed wheel fixed on the same shaft in such a way that it travels together with the said paper drum carriage and turns with the shaft on which it is mounted; and a rack which engages the last mentioned toothed wheel and is firmly fixed to a sliding piece which slides over the said guide arm, substantially as and for the purposes hereinbefore set forth.

10. In a typewriter, the combination of a revoluble type drum; a paper drum carriage which moves parallel to the said type drum; a character index board; a guide arm which projects forward from the said paper drum carriage along the surface of the said character index board; a sliding piece which slides over the said guide arm; a rack firmly fixed to the said sliding piece; a toothed wheel which is mounted on a shaft which extends parallel to the direction of the movement of the said paper drum carriage in such way that it moves together with the paper drum carriage; another toothed wheel which is firmly fixed to the said shaft; a type drum reversing gearing consisting of one toothed wheel and a pair of toothed wheels parallel thereto, said gearing being so constructed that it moves, and the one toothed wheel or the pair of toothed wheels as desired, engage the last mentioned toothed wheel; a toothed wheel which is fixed to the shaft of the aforesaid type drum and which engages the said type drum reversing gearing; and a type drum reversing lever which is fulcrumed on a frame member, one end of which is connected to the said type drum reversing gearing and the other end serves as a handle, substantially as and for the purposes hereinbefore set forth.

11. In a typewriter, the combination of a revoluble type-drum; a paper drum carriage which moves parallel to the said type drum; a projection provided on the said paper-drum carriage, and a rack which extends parallel to the direction of the movement of the paper-drum carriage and which is so mounted that it can be moved and thus can engage or disengage the said projection; a toothed ring fixed to the type-drum or the shaft thereof; a pawl which is pivoted to a frame member and which engages the said toothed ring; a type-drum release lever fulcrumed on a frame member; and a mechanism which connects the said release lever to the said rack and pawl, substantially as and for the purposes hereinbefore set forth.

In testimony whereof I have signed my name to this specification in the presence of two subscribing witnesses.

YUSAKU SHINOZAWA.

Witnesses:
H. F. OLTMANS,
YERKIO KANEIDEO.

Copies of this patent may be obtained for five cents each, by addressing the "Commissioner of Patents, Washington, D. C."